US008928878B2

(12) United States Patent
Jaeschke et al.

(10) Patent No.: US 8,928,878 B2
(45) Date of Patent: Jan. 6, 2015

(54) ADJUSTING DEVICE FOR ADJUSTING THE RETICLE UNIT OF A TELESCOPIC SIGHT

(75) Inventors: Oliver Jaeschke, Bayreuth (DE); Gerd Lottes, Pegnitz (DE)

(73) Assignee: Steiner-Optik GmbH, Bayreuth (DE)

( * ) Notice: Subject to any disclaimer, the term of this patent is extended or adjusted under 35 U.S.C. 154(b) by 0 days.

(21) Appl. No.: 14/004,214

(22) PCT Filed: Mar. 10, 2011

(86) PCT No.: PCT/DE2011/000251
§ 371 (c)(1),
(2), (4) Date: Sep. 10, 2013

(87) PCT Pub. No.: WO2012/119574
PCT Pub. Date: Sep. 13, 2012

(65) Prior Publication Data
US 2014/0002815 A1    Jan. 2, 2014

(51) Int. Cl.
*G02B 27/36* (2006.01)
*F41G 11/00* (2006.01)
*F41G 1/38* (2006.01)

(52) U.S. Cl.
CPC . *G02B 27/36* (2013.01); *F41G 1/38* (2013.01)
USPC ............. 356/247; 359/428; 359/813; 33/298; 42/122

(58) Field of Classification Search
USPC .......... 356/247; 359/424, 427, 428, 429, 813; 33/298; 42/119, 120, 122, 129
See application file for complete search history.

(56) References Cited

U.S. PATENT DOCUMENTS

| 5,513,440 | A | * | 5/1996 | Murg | 42/122 |
| 6,691,447 | B1 | | 2/2004 | Otteman | |
| 7,612,952 | B2 | | 11/2009 | Schaefer | |
| 8,479,402 | B2 | | 7/2013 | Schmitt | |
| 2003/0145505 | A1 | | 8/2003 | Kenton | |
| 2013/0160344 | A1 | * | 6/2013 | Thomas et al. | 42/122 |
| 2013/0312310 | A1 | * | 11/2013 | Geller | 42/122 |
| 2014/0165782 | A1 | * | 6/2014 | Windauer | 74/813 L |

FOREIGN PATENT DOCUMENTS

DE   102006016834 A1   10/2007
EP      2314978 A2    4/2011

* cited by examiner

*Primary Examiner* — Hoa Pham
(74) *Attorney, Agent, or Firm* — Laurence A. Greenberg; Werner H. Stemer; Ralph E. Locher

(57) ABSTRACT

An adjusting device adjusts a reticle unit of a telescopic sight and has a rotatable setting cap and a transmission unit for converting the turning movement of the setting cap into an adjusting movement of the reticle. The turning range of the setting cap is two revolutions and arranged on the adjusting device there are two sets of scale values assigned to at least one line scale. A first set of scale values indicate adjustment values that belong to the first revolution of the setting cap and a second set of scale values indicate adjustment values that belong to the second revolution. An index ring that bears the scale values and can be turned with the setting cap or a diaphragm ring that partially covers at least one index ring is adjustable in height during the transition from the first revolution to the second revolution of the setting cap.

13 Claims, 7 Drawing Sheets

ADJUSTING DEVICE FOR ADJUSTING THE RETICLE UNIT OF A TELESCOPIC SIGHT

BACKGROUND OF THE INVENTION

Field of the Invention

The invention relates to an adjusting device for adjusting the reticle unit of a telescopic sight.

DE 10 2006 016 834 A1 discloses an adjusting device that is used to adjust a reticle unit of a telescopic sight. The overall turret-like adjusting device has a rotatable setting cap which is coupled via a transmission unit to the reticle inside the telescopic sight, in order to convert the rotation movement of the setting cap into an adjusting movement of the reticle, which adjusting movement is generally linear. Adjusting devices of this kind are used to adapt the reticle to different firing distances. To ensure extremely fine adjustment and, therefore, a precise firing result, the turning range of the setting cap in the known device is designed for more than one revolution, i.e. it comprises approximately two full revolutions. The user has the possibility of reading off the rotation position of the setting cap, and therefore of adapting the reticle to the firing distance, on the basis of scale values assigned to the respective turning ranges. One circumferential set of scale values belongs to the first revolution, or to a first turning range of the setting cap, and a second set of scale values, which is arranged over or under the first set, belongs to the second turning range of the setting cap.

In the known adjusting device, both sets of scale values are always visible. To allow the user to decide which set of scale values is the appropriate one depending on the position of the setting cap within a first or second turning range, the known device has a tactile display means which protrudes from the adjusting device when the setting cap is set within the second turning range.

Alternatively, in the prior art document, provision is also made for the setting cap to have a perceptible catch mechanism, which is formed by second locking means when the rotation position of the setting cap is within the second turning range. A disadvantage of these known setting devices is that the two always visible scale values can be confused with each other despite the measures that are taken.

BRIEF SUMMARY OF THE INVENTION

The object of the invention is to design an adjusting device in which the ease of reading off the scale values is improved and the user is assisted in terms of avoiding errors.

According to the invention, provision is made that, during the transition from the first turning range to the second turning range of the setting cap, at least one index ring bearing the scale values and/or a diaphragm ring partially covering an area of an index ring is adjustable in height in such a way that, during the first revolution of the setting cap, only a first set of the scale values is visible and, during the second revolution of the setting cap, the second set of scale values is also visible in addition to the first set or preferably visible on its own.

There are various mechanical possibilities for doing this. A first possibility is to arrange the first set of scale values on a first index ring and to arrange the second set of scale values on a second index ring arranged inside the first index ring, and, during the transition from the first turning range of the setting cap to the second turning range, to move the first index ring, i.e. the outer index ring, upward in such a way that, prior to the height adjustment (first turning range), the scale values on the second index ring are covered and only the scale values on the first, outer index ring are visible, and, after the height adjustment, i.e. within the second turning range, the view of scale values arranged on the second index ring is cleared by the first index ring and the scale values arranged on the first index ring disappear under a diaphragm area. It is possible here to move the outer index ring either upward or downward and to provide the covering diaphragm area for the first scale values either at the top or bottom on the outer index ring.

A further possibility is to provide both the first scale values and also the second scale values, together with at least one line scale that can be arranged for example between the first and second scale values, on only one index ring and to move these upward and downward, depending on the turning range within a transition area, such that the first set of scale values is covered, or alternatively the second set of scale values is then covered, and the other is visible.

A further possibility is one in which the index ring with the two sets of scale values is not adjustable in height, and the outside of the index ring is provided with upper and lower ring diaphragms which, depending on the chosen turning range, cover the upper or lower set of scale values on the non-height-adjustable index ring. A combination of height-adjustable diaphragms and height-adjustable index rings is also conceivable.

In a preferred illustrative embodiment, provision is made that, during the transition from the first revolution to the second revolution of the setting cap, the first set of scale values of the first, outer index ring is moved underneath a downwardly pointing edge of the setting cap and is thereby covered. As a result of the height adjustment of the first index ring, the lower edge of the first index ring frees the second set of scale values, which are arranged on the non-height-adjustable second index ring arranged inside the first index ring.

In principle, the first index ring and the second index ring, whether they are height-adjustable or not, are rotated synchronously with the setting cap. Scale values corresponding to one setting of the reticle can be read off on the basis of an index mark, which is arranged non-rotatably on a base of the adjusting device. The adjusting device overall has a turret-like structure, the base area of the turret-like structure is used for fastening on the top of a telescopic sight, since finely adjustable adjusting devices of this kind are generally used to adjust the reticle height, since only in this way is adaptation to different firing distances possible.

To adjust the height of the one or more index rings or of the at least one diaphragm ring, a circumferential slotted guide is arranged in the inner area of the adjusting device, into which slotted guide a tracer pin engages which can be coupled, directly or via intermediate parts, to an index ring or a diaphragm. Depending on the rotation position, the pin will remain in the slotted guide during the first turning range without height adjustment, and the index ring coupled thereto will thus retain its height position. When, after further rotation, the pin reaches the middle area of the slotted guide, which area has a beveled step profile, the pin will follow this beveled step profile and thus cause the height adjustment of the index ring or diaphragm ring coupled to it. Within the second turning range, the pin then follows the guide groove of the slotted guide substantially parallel to the first turning range, and no further height adjustment then takes place within the second turning range.

The invention is explained in more detail on the basis of illustrative embodiments in the figures.

DESCRIPTION OF THE INVENTION

Figure 1:
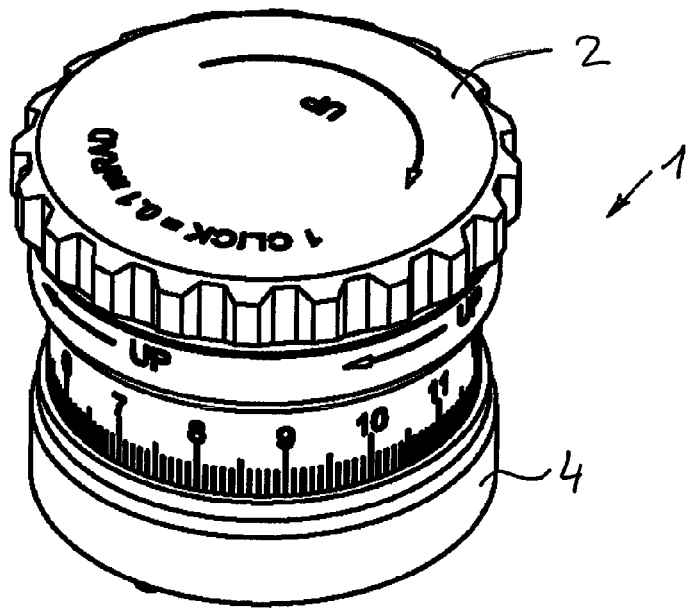
FIG. 1 shows a perspective view of the adjusting device according to the invention.

The adjusting device 1 shown in the figures is used to adjust the reticle unit of a telescopic sight (not shown) and has a rotatable setting cap 2, which is arranged rotatably on the upper end of an overall turret-shaped structure of the adjusting device 1.

A transmission unit 3, with which the rotation movement of the setting cap 2 is converted into an adjusting movement of the reticle, is arranged in the interior of the adjusting device 1. The transmission unit 3 protrudes downward from a base area 4 of the adjusting device 1.

The turning range of the setting cap 2 comprises substantially two revolutions. Two sets of scale values 7 assigned to at least one line scale 6 are arranged in the middle area 5 of the adjusting device 1, wherein a first set of scale values 7a indicates adjustment values that belong to the first revolution of the setting cap 2, and a second set of scale values 7b indicates adjustment values that belong to the second revolution of the setting cap 2.

During the transition from the first revolution to the second revolution of the setting cap 2, i.e. in the so-called transition area, an index ring bearing the scale values 7a and rotatable preferably synchronously with the setting cap 2 is adjustable in height in such a way that, during the first revolution of the setting cap 2, only a first set of the scale values 7a is visible and the second set of scale values 7b is arranged under a covering and, during the second revolution of the setting cap 2, only the associated second set of scale values 7b is visible, in which case the first set of scale values 7a is arranged under a covering. Coverings can be diaphragm areas extending in a ring shape, for example a downwardly protruding edge 9 of the setting cap 2, which edge 9 is arranged in the area of the upper edge of the index ring 8, and underneath which edge 9 the first set of scale values 7a disappears when the index ring 8 is moved upward.

Figure 2:
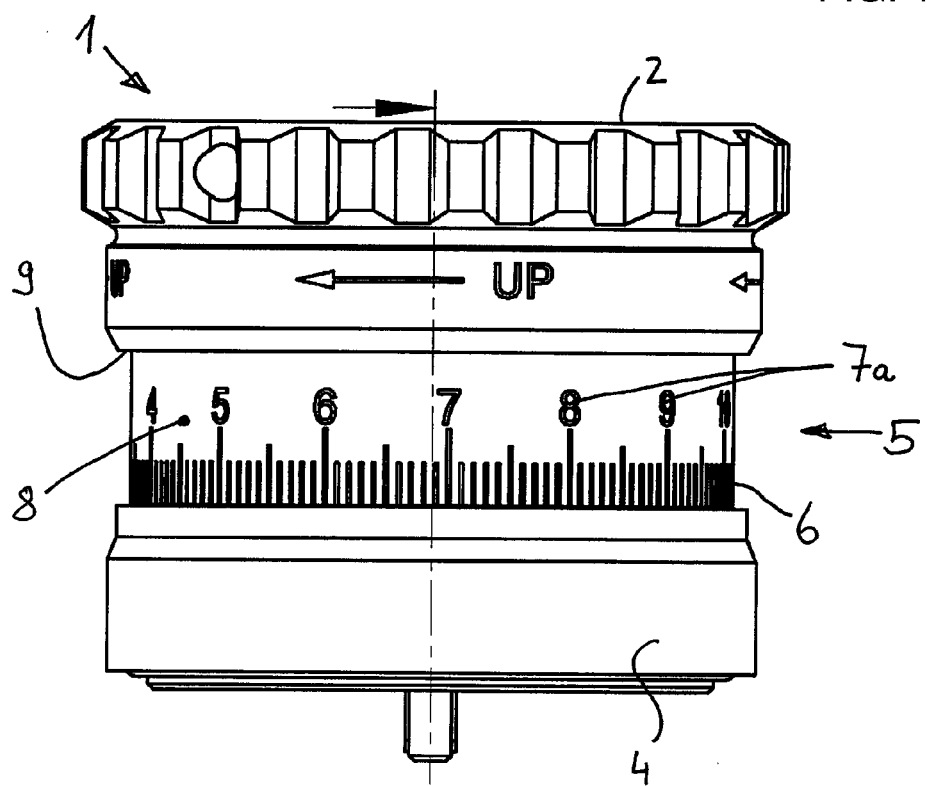
FIG. 2 shows a side view of the adjusting device in accordance with FIG. 1.
Figure 3:
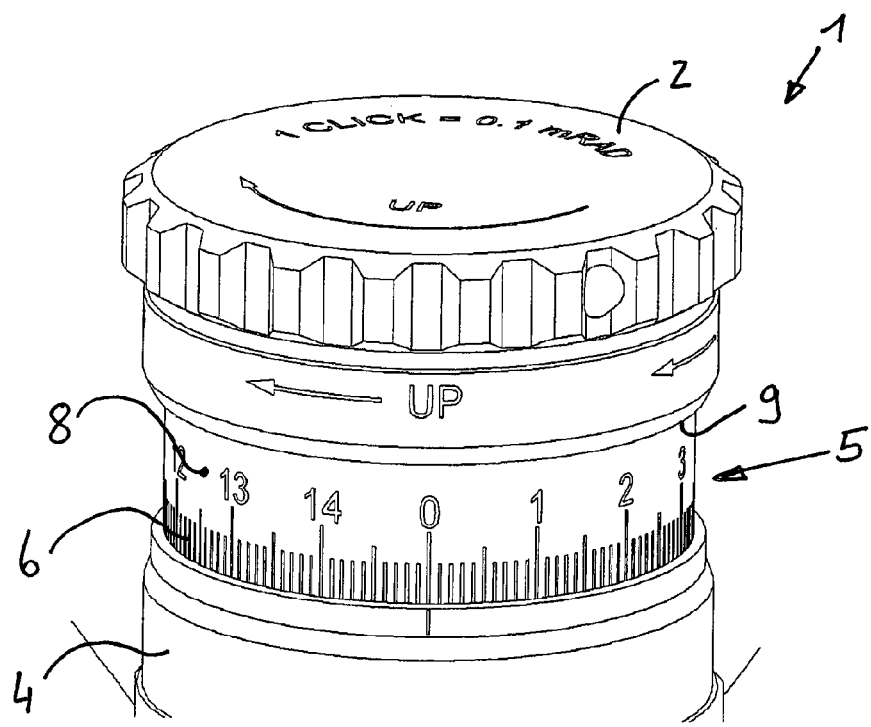
FIG. 3 shows a detailed side view before initiation of an adjusting rotation movement over the first turning range.
Figure 4:
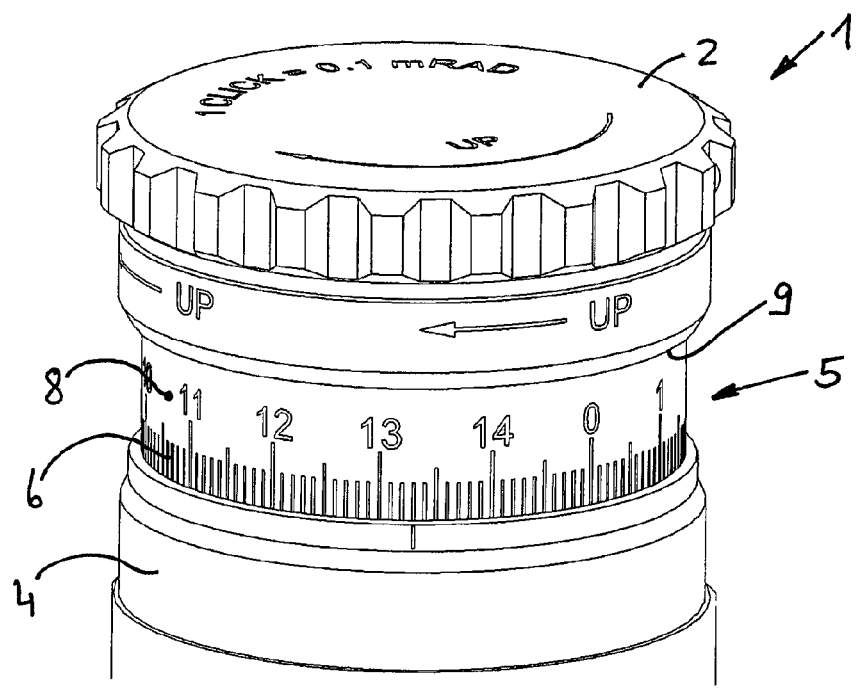
FIG. 4 shows a view in accordance with FIG. 3, wherein the first turning range has been almost completed.
Figure 5:
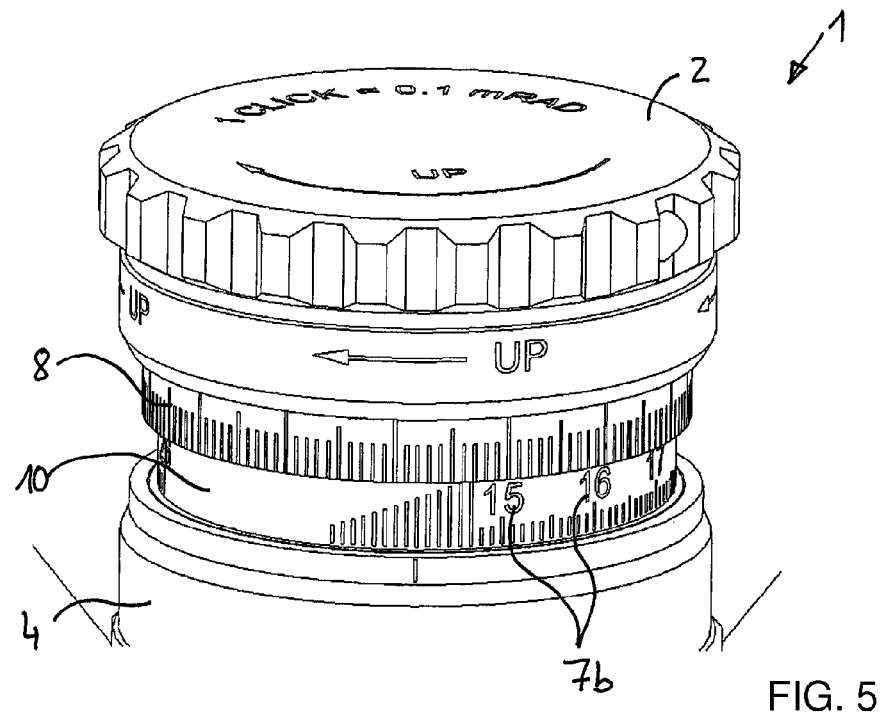
FIG. 5 shows a view in accordance with FIG. 4, wherein a further rotation takes place into the area of a transition between the scales.
Figure 6:
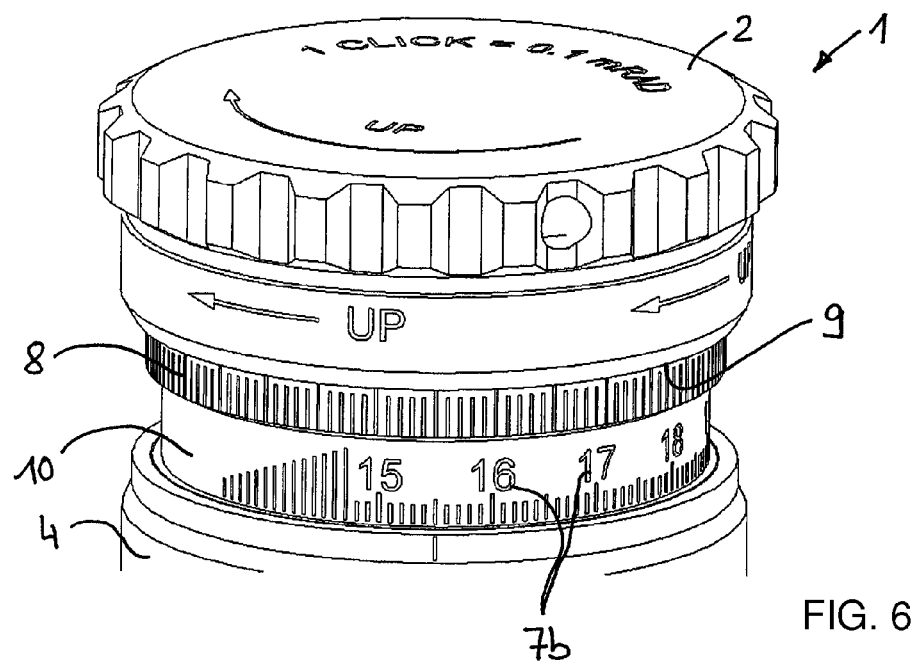
FIG. 6 shows a view in accordance with FIG. 5, wherein the rotation movement has continued such that only scale values of the second turning range are visible.

In the illustrative embodiment shown in FIGS. 1-8, a second index ring 10 is arranged under the index ring 8 visible in FIGS. 1 and 2, which second index ring 10 bears the second scale values 7b and, prior to the transition, i.e. prior to the height adjustment of the index ring 8, is covered by said index ring. The first index ring 8 as it were forms the covering for the second index ring and for the second scale values 7b arranged on the latter.

In the illustrative embodiment shown in FIGS. 1-8, the height adjustment of the first index ring 8 is upward, such that the first scale values 7a are brought underneath the downwardly pointing edge 9 of the setting cap. However, it is equally possible to move the outer, first index ring downward, during the transition from the first turning range to the second turning range of the setting cap, and to lower the first scale elements 7a underneath a ring diaphragm in the area of the base 4.

Figure 10:
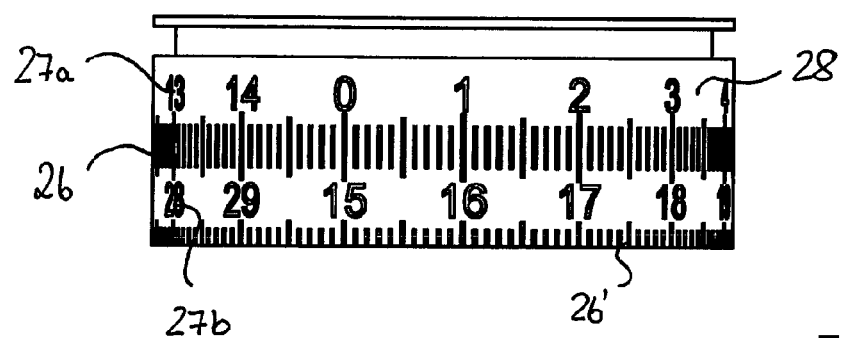
FIG. 10 shows an alternative embodiment of an index ring with two alternately coverable rows of scale values.
Figure 11:
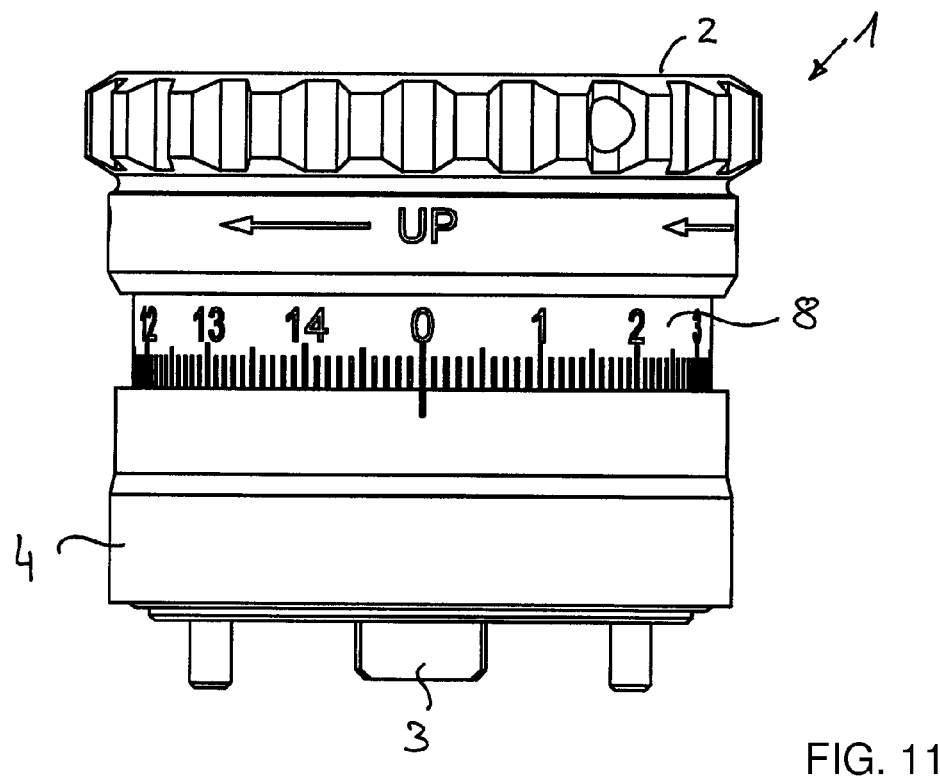
FIG. 11 shows a modified embodiment with a scale disk in accordance with FIG. 10 in a first rotation position.
Figure 12:
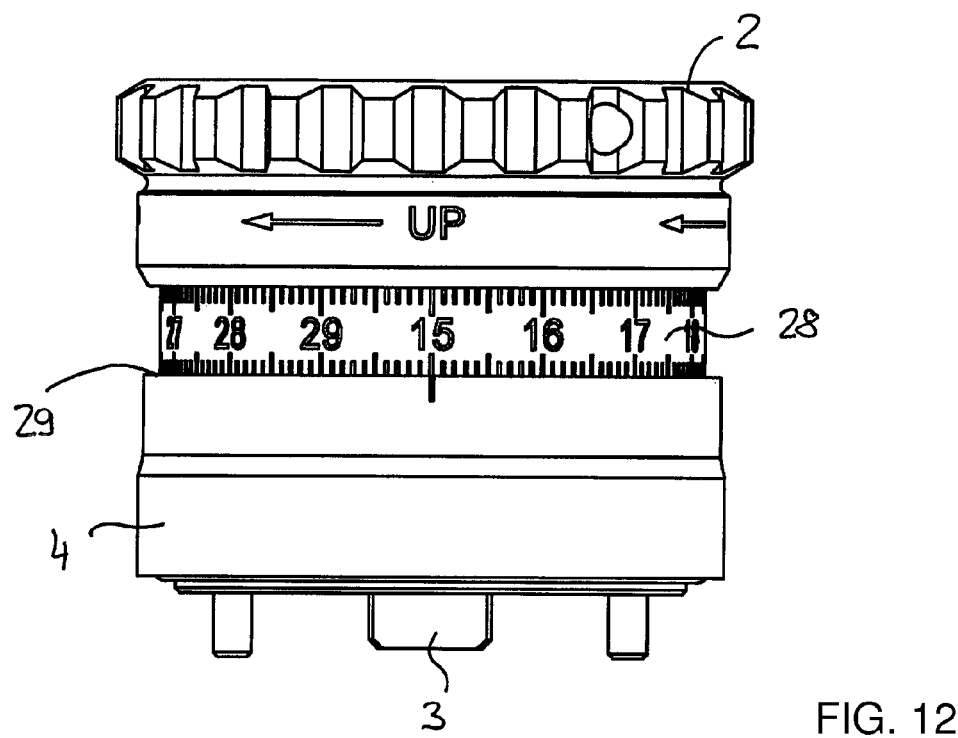
FIG. 12 shows a view in accordance with FIG. 11 in a modified rotation position.

A further embodiment within the scope of protection of claim 1 involves both sets of scale values 27a and 27b being arranged above and below a line scale 26 on one index ring 28. An illustrative embodiment of this kind is shown in FIGS. 10-12. During the transition from the first turning range to the second turning range of the setting cap 2, this index ring 28 as a whole can be moved upward and downward, such that, on the one hand, the first index values 27a are visible and, on the other hand, the second index values 27b are visible. Arranged on the lower edge of the index ring 28, there is also a further line scale 26', which allows parallax-free reading. In this embodiment too, the index ring 28 is moved upward during the transition, such that the second scale values 27b belonging to the second turning range are moved upward out of a lower ring diaphragm 29 that conceals them during the first turning range. The lower ring diaphragm 29 forms the top edge of the base area 4.

The index ring shown in FIG. 10 can also be arranged to be fixed in terms of its height in the adjusting device. During the transition, upper and lower diaphragms, for example the lower ring diaphragm 29 and an upper ring diaphragm as shown in FIG. 11, are then moved upward and downward. This also has the effect that only one set of scale values 27a or 27b is visible at any one time, such that inaccurate adjustments by the person operating the adjusting device 1 are avoided.

Figure 13:
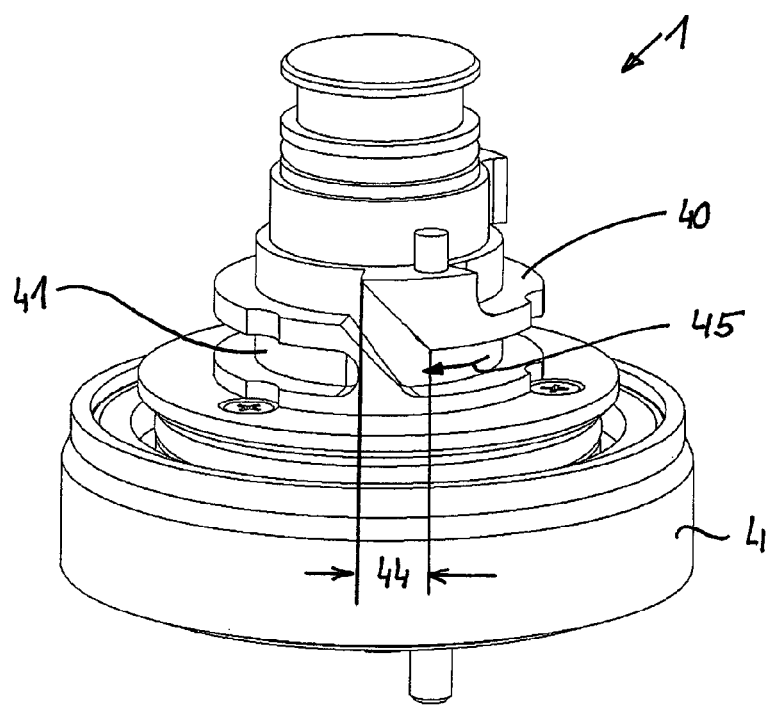
FIG. 13 shows a view of a slotted guide inside the adjusting device.

FIG. 13 shows a perspective view of an inner area of the turret-shaped structure of the adjusting device 1. A slotted guide 40 is arranged fixed in rotation on the base area 4 and has a circumferential channel 41 into which a tracer pin 42 (FIG. 7) engages that is coupled via coupling elements 43 (cf. FIGS. 7 and 8) to the height-adjustable elements, for example the index ring 8.

In the middle area 44 of the slotted guide, the channel 41 has a beveled step profile, such that a tracer pin, which is moved toward the middle area 44 of the slotted guide in arrow direction 45 according to FIG. 13, performs an upward excursion that corresponds to the spacing of the two circumferential channels 41, resulting in the height adjustment of the component coupled to the pin 42, in particular of the height-adjustable index ring 8 or 28.

Figure 7:
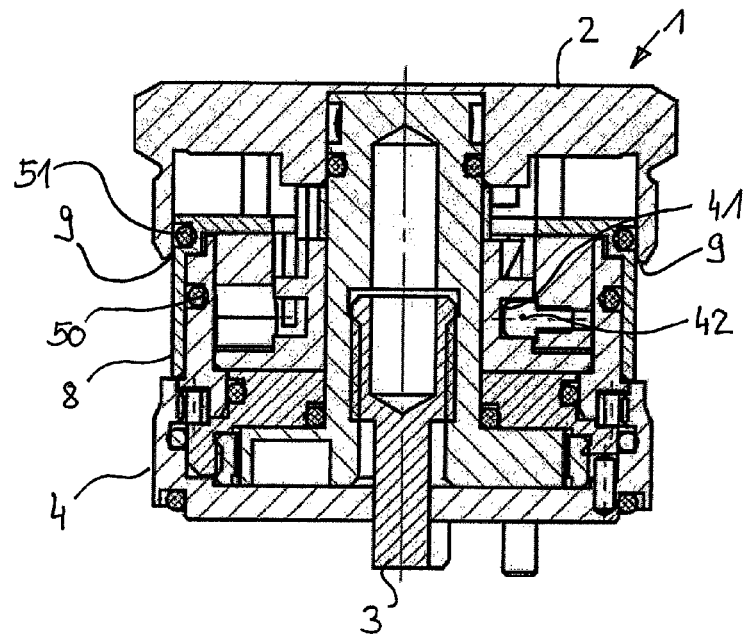
FIG. 7 shows a central vertical cross section through the adjusting device, wherein a scale display in accordance with FIG. 3 is visible.
Figure 8:
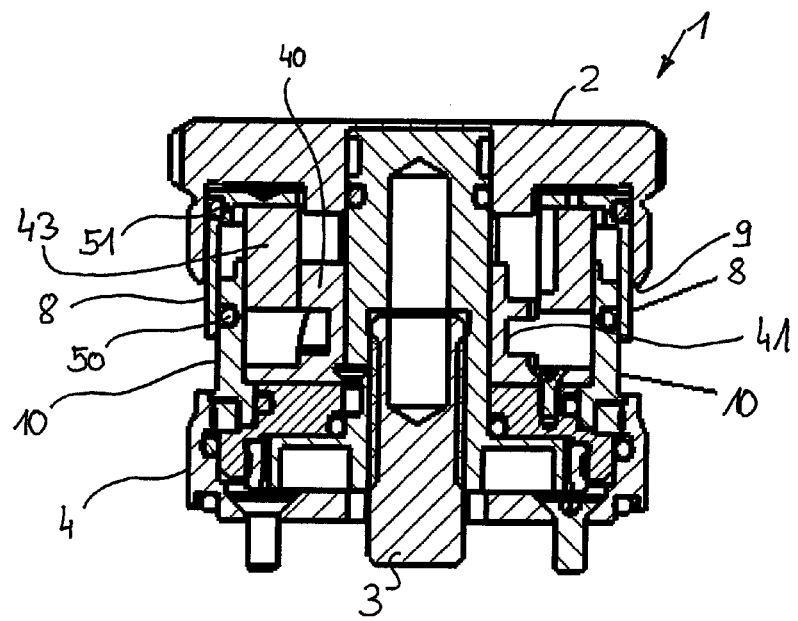
FIG. 8 shows a cross section in accordance with FIG. 7 after transition, wherein a scale display in accordance with FIG. 6 is visible.
Figure 9:
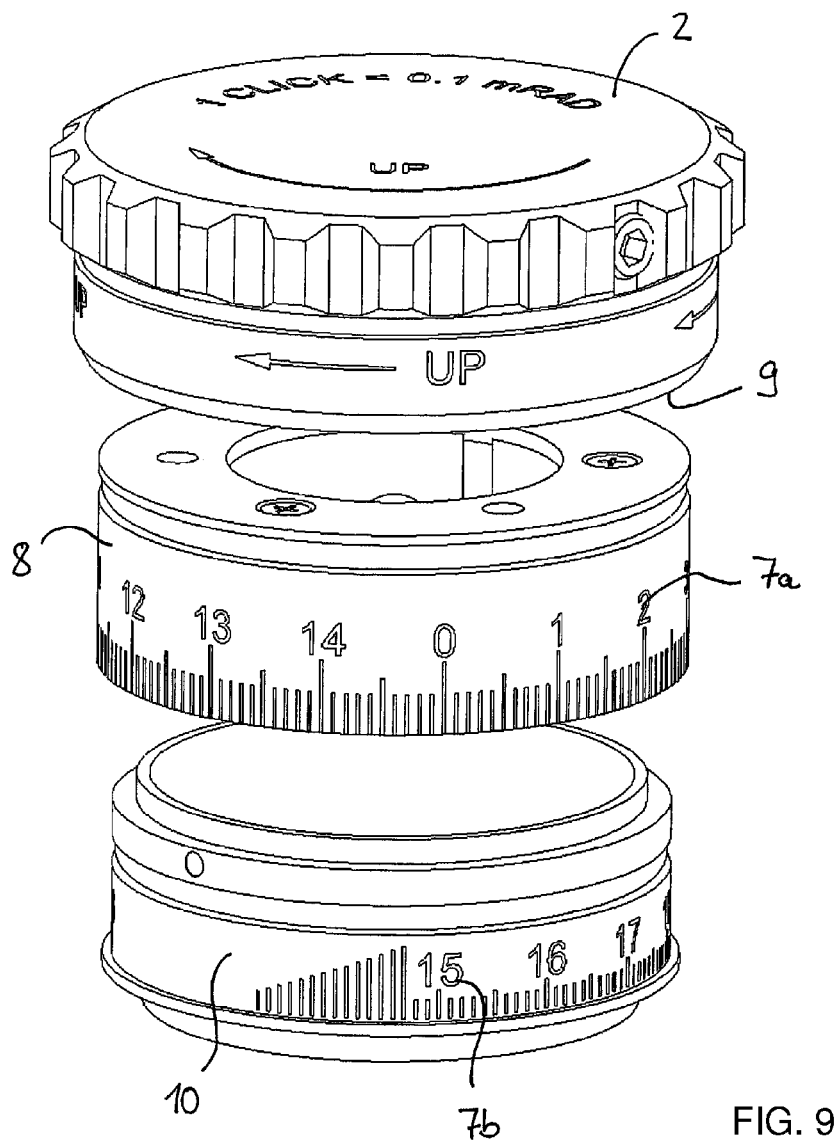
FIG. 9 shows the two index rings and the setting cap in an exploded view.

It will also be seen from FIGS. 7 and 8 that parts moving in relation to each other are sealed off by a plurality of O-rings. For example, an O-ring 50 is provided for sealing between the surface of the second index ring 10 and the inside face of the first index ring 8. A further O-ring 51 seals off the upper, radially outer area of the first index ring 8 in relation to the inside face of the downwardly protruding edge 9 of the setting cap 2.

Finally, it will be noted that the invention is not limited to the illustrative embodiments shown, and instead the scope of protection attributable to the invention derives from the claims and from their interpretation.

LIST OF REFERENCE SIGNS 1 adjusting device
2 setting cap
3 transmission unit
4 base area
5 middle area
6 line scale
7a scale values
7b scale values
8 index ring
9 edge of 2
10 2nd index ring
26 line scale
26' line scale
27a scale values
27b scale values
28 index ring
29 lower ring diaphragm
40 slotted guide
41 channel of slotted guide
42 tracer pin
43 coupling elements
44 middle area of slotted guide
45 arrow direction
50 O-ring
51 O-ring

The invention claimed is:

1. An adjusting device for adjusting a reticle unit of a telescopic sight, the adjusting device comprising:
a rotatable setting cap;
a transmission unit for converting a rotation movement of said rotatable setting cap into an adjusting movement of the reticle unit, wherein a turning range of said rotatable setting cap is substantially two revolutions;
at least one index ring;
a diaphragm ring partially covering said at least one index ring and functioning as a covering; and
two sets of scale values assigned to at least one line scale disposed on said at least one index ring, said two sets of scale values include a first set of scale values indicating adjustment values that belong to a first revolution of said rotatable setting cap, and a second set of scale values indicating adjustment values belonging to a second revolution of said rotatable setting cap, during a transition from the first revolution to the second revolution of said rotatable setting cap, said at least one index ring bearing said scale values and can be rotated with said rotatable setting cap or said diaphragm ring, being adjustable in height such that, during the first revolution of said rotatable setting cap, only said first set of scale values is visible and said second set of scale values is disposed under said covering and, during the second revolution of said rotatable setting cap, said second set of scale values is either visible in addition to said first set of scale valves or on its own.

2. The adjusting device according to claim 1, wherein said covering is one of a plurality of coverings for said first and second scale values and are disposed in an area of at least of an upper edge or a lower edge of said at least one index ring.

3. The adjusting device according to claim 2, wherein said two sets of scale values are respectively disposed above and below said line scale being a circumferential line scale on said index ring.

4. The adjusting device according to claim 1, wherein:
said a least one index ring includes a first index ring and a second index ring; and
said first set of scale values are disposed on said first index ring and said second set of scale values are disposed on said second index ring, and, during a transition from the first revolution to the second revolution of said rotatable setting cap, one of said first and second index rings is adjustable in height such that, in a turning range of the second revolution of said rotatable setting cap, said first set of scale values disposed on said first index ring are concealed by said covering being a ring-shaped component, and said second set of scale values disposed on said second index ring are visible.

5. The adjusting device according to claim 4, wherein said first index ring is disposed lying on an outside and is adjustable in height, said second index ring is disposed inside said first index ring, and said first index ring forms said covering for said second set of scale values assigned to a second turning range.

6. The adjusting device according to claim 5, wherein in the turning range of the first revolution of said rotatable setting cap, said first index ring covers the second set of scale values of said second index ring.

7. The adjusting device according to claim 4, wherein during a transition from the first revolution to the second revolution of said rotatable setting cap, the first set of scale values of said first index ring can be moved underneath a downwardly pointing edge of said rotatable setting cap.

8. The adjusting device according to claim 4,
further comprising at least one circumferential slotted guide disposed in an inner area of the adjusting device, said slotted guide having a middle area with a beveled step profile; and
wherein at least one of said index rings or said diaphragm ring has a tracer pin engaging into said at least one circumferential slotted guide for adjusting a height of at least one of said index rings or of said diaphragm ring, said circumferential slotted guide is mounted non-rotatably with respect to said rotatable setting cap and to said index rings turning with said rotatable setting cap.

9. The adjusting device according to claim 8,
wherein the adjusting device is structured like a turret;
further comprising a lower base area having a fastening base for fastening on a telescopic sight;
further comprising an upper area having said rotatable setting cap;
further comprising at least one coupling part; and
further comprising a middle area having said at least one index ring turning with said rotatable setting cap, said index ring coupled for height adjustment, via said at least one coupling part, to said tracer pin engaging in said circumferential slotted guide.

10. The adjusting device according to claim 4, wherein said first index ring is a first, outer index ring, said first, outer index ring and said second index ring are disposed lying coaxially one over the other, and said first, outer index ring engages like a pot, and with slight spacing, over said second index ring.

11. The adjusting device according to claim 4,
further comprising a base part; and
wherein said second index ring is a second, inner index ring being rotatable with said rotatable setting cap and is unchangeable in terms of its height with respect to said base part.

12. The adjusting device according to claim 1, wherein during a transition from the first revolution to the second revolution of said rotatable setting cap, the second set of scale values belonging to the second turning range are moved out from said diaphragm ring that conceals them during the first turning range.

13. The adjusting device according to claim 1, wherein during the second revolution of said rotatable setting cap, said second set of scale values is visible and said first set of scale values is disposed under said covering.

\* \* \* \* \*